Patented Aug. 10, 1943

2,326,134

UNITED STATES PATENT OFFICE 2,326,134

MANUFACTURE OF BAKED GOODS

Jacob Freilich, Bronx, and Charles N. Frey, Scarsdale, N. Y., assignors to Standard Brands Incorporated, New York, N. Y., a corporation of Delaware No Drawing. Application December 15, 1939, Serial No. 309,346

6 Claims. (Cl. 99—90)

The invention relates to a method for the manufacture of baked goods More particularly, it pertains to a procedure for the production of leavened baked products, and includes correlated improvements and discoveries whereby such may be obtained.

It is an object of the invention to provide a method whereby leavening of baked goods may be accomplished without the action of yeast.

A further object of the invention is to provide a procedure for the manufacture of baked goods in which leavening is effected by a suitable gas under pressure.

Another object of the invention is the provision of a method for the production of non-yeast leavened baked products which may be readily, effectively and economically practiced on any desired scale.

A more specific object of the invention is to provide a method for the manufacture of leavened bread by mixing ingredients to form a dough in the presence of carbon dioxide under pressure, and with correlation of mixing time, temperature, pH value of the dough and absorption.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention leavened baked goods may be manufactured by admixing flour, water and other ingredients, without yeast, to form a dough in the presence or under the influence of a gas under pressure, which may be carbon dioxide or other inert and innocuous gas. The formation of the dough may be effected in a suitable mixer, as a Readco vacuum-pressure mixer, and may be attained by an initial removal of air through evacuation followed by introduction of an inert gas, e. g. carbon dioxide at a suitable pressure.

Further, the making of the dough may entail the addition of an amount of water which is sufficient to give an absorption of from 54 to 66%, preferably 58 to 62%, with mixing for a period of at least six minutes in the presence of carbon dioxide under pressure which may be upwards of 20 lbs. gauge, more particularly about 40 to 60 lbs., and a temperature which may be from 60° to 90° F., specifically around 80° F. When the dough has been formed it is substantially immediately baked by dividing, e. g. by means of a suitable extruder, with as little loss of gas as possible, placing in pans, and then in the oven where it may be baked at a temperature of about 210° C. for about thirty-five minutes.

Moreover, where a more pronounced proteolytic action is desired or, in the event that a flour is being utilized which has a low proteolytic enzyme content, the ingredients may include a suitable proteolytic enzyme, as papain and bromelin. The amount of papain added may be about 10 mg. and upwards to about 50 mg. for each loaf containing 300 grs. of flour. There may also be included in the dough mix a small amount of a bromate whereby gluten is conditioned, and which may be present in an amount ranging, for example, from 4 to 25 mg. per 300 grs. of flour. The papain and the bromate may be included, if desired, in conjunction with an acid, as hydrochloric acid. In order to simulate the yeast flavor the dough mix may contain also an edible acid substance, more especially an organic acid, and specifically tartaric, lactic, citric, acetic, hydrochloric and phosphoric acids, or this result may be attained through the addition of certain esters, glycerol, acetyl methyl carbinol, diacetyl and alcohol which arise during the usual yeast dough fermentation. A satisfactory acidity is that which is represented by a pH value of about 5.0 to 5.8, and a dough mass having a pH value of about 5.3 is preferred. Moreover, a higher pH value might be availed of, e. g. up to 7.5 and 8.0.

Further, the flavor of the baked product may be improved and approach that of yeast leavened bread by incorporating into the dough batch a fermenting yeast suspension. This may be produced by preparing a water suspension of yeast containing sugar and a malt product, allowing it to stand at 30° C. for about three hours, and then introducing into the dough. The dough may be mixed in carbon dioxide under pressure, and is baked immediately thereafter.

Manufacture of bread may be carried out by preparing a dough containing for each loaf of about 1 lb., 300 grams of flour, water 62% based on the weight of the flour, salt 1.66%, sugar 5% and shortening 3.33%. The ingredients are placed in a suitable mixer, as a Readco vacuum-pressure mixer, and mixed therein for a period of about six minutes. The mixing is effected in the presence of carbon dioxide or the like under pressure of about 40 lbs. gauge at a temperature of about 80° F. Following mixing, the dough is placed in a pan and immediately baked for about thirty-five minutes at a temperature of about 210° C. The baked loaf is then permitted to cool, whereupon it may be weighed and wrapped. In order to ascertain the effect of various pressures of the gas, as carbon dioxide, bakes were made following the foregoing procedure, but in which the mixing was carried out under different pressures. The effect was determined by measuring the volumes of the loaves and calculating the volume per pound of bread. The following results were obtained:

| $CO_2$ pressure, pounds (gauge pressure) | Volume per pound of bread |
|---|---|
| | Cubic centimeter |
| 0 (no $CO_2$ used) | 500 |
| 5 | 930 |
| 10 | 960 |
| 20 | 1,310 |
| 40 | 1,450 |
| 60 | 1,610 |

A marked increase in the volume of the loaf is noted as the pressure of the carbon dioxide rises, and the volume increase was accompanied by improved appearance and texture. Thus, a loaf mixed without carbon dioxide was quite solid, gummy, completely unleavened and not at all palatable, but when mixed in the presence of carbon dioxide the loaf characteristics improved as the pressure was increased, so that the loaves were definitely better with respect to tenderness and palatability, and when mixed under a pressure of 60 lbs. gauge the loaves had an appearance and feel of yeast-raised bread. The bread leavened with carbon dioxide under pressure possesses a taste which is different from that of yeast leavened bread, and in order to impart to the mix a taste which is like unto that of yeast, there may be included an edible acid substance, or an ester, glycerol and alcohol, as above indicated. It is thus demonstrated that a satisfactory bread may be made without yeast by mixing the dough in carbon dioxide under pressure of from 20 to 60 lbs.

It has been found convenient to effect the mixing under a pressure of 40 lbs. The effect of dough temperature upon the baked product, as shown by the volume per lb. of bread, was illustrated by mixing doughs at rather widely varying temperatures, and then baking. The formula utilized was that hereinbefore given, and the mixing was carried out in a Readco vacuum pressure-mixer for a period of about six minutes in the presence of carbon dioxide at a pressure of 40 lbs. gauge. The results obtained are shown in the following table:

| Dough temperature, ° F. | Volume per pound of bread |
|---|---|
| | Cubic centimeter |
| 51 | 1,200 |
| 56 | 1,430 |
| 64 | 1,570 |
| 72 | 1,590 |
| 75 | 1,490 |
| 75 | 1,670 |
| 78 | 1,580 |
| 80 | 1,610 |
| 80 | 1,680 |
| 86 | 1,420 |
| 86 | 1,510 |
| 90 | 1,530 |
| 92 | 1,410 |
| 95 | 1,410 |
| 99 | 1,200 |
| 102 | 1,210 |
| 106 | 980 |

The loaves having a volume of about 1200 cc. or less were not sufficiently leavened to give a satisfactory loaf, but those having a higher volume were sufficiently leavened and gave a product that was palatable. From these experiments it is clear that a satisfactory bread may be produced with a dough temperature that may vary over a considerable range, more particularly between about 60° and 90° F., and preferably about 80° F.

The influence of variation in mixing time is shown in the tabulation immediately hereinafter given. Mixing of doughs was effected in the presence of carbon dioxide under a pressure of about 40 lbs. gauge, and the dough temperature was maintained at about 80° F.

*Variations in mixing time*

| Mixing time minutes | Volume per pound of bread |
|---|---|
| | Cubic centimeter |
| 3 | 1,320 |
| 6 | 1,600 |
| 9 | 1,620 |
| 12 | 1,520 |

All of the loaves were of relatively good volume, satisfactory and substantially alike with the exception of that produced from the dough mixed only for three minutes. The three minute mix yielded a bread which was darker and heavier than the others. Hence, it is demonstrated that a desirable period for mixing is about six minutes and, further, that this time may be extended considerably without substantial detriment to the baked product.

A study of the effect of variations in absorption was made with the doughs being mixed for six minutes in the presence of carbon dioxide at 40 lbs. pressure, and with a dough temperature of about 80° F. The following results were obtained:

*Variations in absorption*

| Absorption percent | Volume per pound |
|---|---|
| | Cubic centimeter |
| 54 | 1,490 |
| 58 | 1,510 |
| 62 | 1,460 |
| 66 | 1,430 |
| 70 | 1,330 |
| 74 | 1,190 |

An absorption of from 54 to 66% gave loaves which were all satisfactory, but that at 66% was not quite as good as with the lower absorption values. The product with 70% absorption was somewhat darker and heavy, and that with 74% was not satisfactory due to it being decidedly darker and heavier than the others. The foregoing results show that a leavened bread may be produced by mixing doughs in carbon dioxide under pressure when the absorption is from 54 to 66%, but when the absorption is higher, for example, 70 or 74%, the doughs are too soft.

Other ingredients than those hereinbefore mentioned may be present in the dough, such as hydrogen peroxide, preferably of 30% strength, a fermenting yeast suspension which may be boiled before addition, lecitho-protein and milk powder. The lecitho-protein may be added in an amount of about 2%; the milk powder about 6%, based on the weight of the flour, and the malt may be utilized in place of a part or all of the sugar.

The procedure for the manufacture of leavened baked goods without the utilization of yeast and wherein the doughs are mixed in the presence of an inert gas under pressure leads to finished products which are like in general characteristics to those obtained by leavening with yeast. This is attained by a correlation of conditions which include forming a dough by mixing ingredients for a period of at least six minutes, the dough having an absorption value of from 54 to 66%, in the presence of an inert gas, as carbon dioxide and the like under a pressure of 20, 40, 60 or more lbs. gauge. Moreover, the temperature of the dough may be from about 60° to 90° F., and the dough is baked substantially immediately at a temperature of about 210° C. for thirty-five minutes.

Further, the gluten may be conditioned by including, among the dough ingredients, a proteolytic enzyme and/or a bromate. If a yeast-like aroma and flavor are desired, the ingredients may contain a compound such as arises in yeast fermentation of a dough, or an edible acid substance. The dough resulting from the mixing is well leavened, light and fluffy in appearance, and the baked product is tender, palatable, with the appearance and feel of a yeast leavened product.

Moreover, a control of the effect of proteolytic enzymes may be accomplished through the utilization of oxygen or of air under pressure. The oxygen or the air preferably may be employed in suitable admixture with carbon dioxide, depending upon the result desired.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A method for the production of baked goods leavened without yeast, which comprises admixing flour, water and other ingredients to form a dough, the amount of water being sufficient to give an absorption of 54 to 66%, in the presence of carbon dioxide under a pressure of from about 20 to about 60 lbs. at a temperature of 60 to 90° F., and then baking substantially immediately.

2. A method for the production of baked goods leavened without yeast, which comprises admixing flour, water and other ingredients to form a dough for a period of at least six minutes, the amount of water being sufficient to give an absorption of about 54 to 66%, in the presence of carbon dioxide under pressure of about 20 to 60 lbs., at a temperature of about 60 to 90° F., and then baking substantially immediately.

3. A method for the production of baked goods leavened without yeast, which comprises admixing flour, water and other ingredients to form a dough for a period of at least six minutes, the amount of water being sufficient to give an absorption of about 58%, in the presence of carbon dioxide under pressure of about 40 lbs. at a temperature of about 80° F., and then baking substantially immediately at a temperature of about 210° C. for about thirty-five minutes.

4. A method for the production of baked goods leavened without yeast, which comprises admixing flour, water and other ingredients including a proteolytic enzyme to form a dough, the amount of water being sufficient to give an absorption of 54 to 66%, in the presence of carbon dioxide under a pressure of from about 20 to about 60 lbs. at a temperature of 60 to 90° F., and then baking substantially immediately.

5. A method for the production of baked goods leavened without yeast, which comprises mixing flour, water, yeast and other ingredients including an edible acid substance having a yeast simulating flavor to form a dough, the amount of water being sufficient to give an absorption of 54 to 66%, in the presence of carbon dioxide under a pressure of from about 20 to about 60 lbs. at a temperature of 60 to 90° F., and then baking substantially immediately.

6. A method for the production of baked goods leavened without yeast, which comprises admixing flour, water and other ingredients to form a dough, the amount of water being sufficient to give an absorption of 54 to 66% in the presence of an inert gas under a pressure from about 20 to about 60 lbs. at a temperature of 60 to 90° F., and then baking substantially immediately.

JACOB FREILICH.
CHARLES N. FREY.